United States Patent [19]
Newman, Jr. et al.

[11] Patent Number: 5,692,856
[45] Date of Patent: Dec. 2, 1997

[54] LOCK ASSEMBLY FOR EXTENSION HANDLE

[75] Inventors: Robert D. Newman, Jr.; Robert D. Newman, Sr., both of P.O. Box 377, Greenwood, Mo. 64034; Buford Guittar, Greenwood, Mo.

[73] Assignees: Robert D. Newman, Sr.; Robert D. Newman, Jr., both of Greenwood, Mo.

[21] Appl. No.: 615,972

[22] Filed: Mar. 14, 1996

[51] Int. Cl.$^6$ ............................................. F16B 2/04
[52] U.S. Cl. ........................ 403/352; 403/350; 403/109
[58] Field of Search ................................ 403/104, 109, 403/350, 351, 352; 16/115

[56] References Cited

U.S. PATENT DOCUMENTS

| | | | |
|---|---|---|---|
| 1,115,057 | 10/1914 | Delaney . | |
| 2,526,415 | 10/1950 | Refsdal . | |
| 2,599,222 | 6/1952 | Bergqvist et al. | 403/351 X |
| 2,850,308 | 9/1958 | Le Febvre et al. | 403/351 X |
| 2,873,129 | 2/1959 | Edmundson . | |
| 3,419,293 | 12/1968 | Conrad . | |
| 3,515,418 | 6/1970 | Nielsen, Jr. . | |
| 3,596,946 | 8/1971 | Burton . | |
| 3,667,788 | 6/1972 | Greenwood . | |
| 3,953,138 | 4/1976 | Hine et al. | 403/351 X |
| 4,076,437 | 2/1978 | Mazzolla | 403/350 |
| 4,238,164 | 12/1980 | Mazzolla . | |
| 4,294,560 | 10/1981 | Larkin | 403/104 |
| 4,324,502 | 4/1982 | Pickles | 403/104 |
| 4,419,026 | 12/1983 | Leto | 403/104 |
| 4,508,467 | 4/1985 | Choffin | 403/104 |
| 4,524,484 | 6/1985 | Graham | 16/115 |
| 4,619,548 | 10/1986 | Kazaoka et al. | 403/290 |
| 4,632,597 | 12/1986 | Clausen et al. | 403/351 |
| 4,659,125 | 4/1987 | Chuan | 403/104 X |
| 4,733,681 | 3/1988 | Lee | 403/104 X |
| 4,856,929 | 8/1989 | Smahlik et al. | 403/297 |
| 4,967,484 | 11/1990 | Nosek | 403/109 X |
| 5,011,104 | 4/1991 | Fang | 403/104 X |
| 5,011,319 | 4/1991 | Levi et al. | 403/109 |
| 5,346,349 | 9/1994 | Giovannetti | 403/350 X |
| 5,375,938 | 12/1994 | Bartlow | 403/202 |
| 5,417,511 | 5/1995 | Warden | 403/109 |
| 5,433,551 | 7/1995 | Gordon | 403/109 X |
| 5,460,458 | 10/1995 | Caceres | 403/109 |
| 5,549,407 | 8/1996 | Levi et al. | 403/109 |

*Primary Examiner*—Anthony Knight
*Attorney, Agent, or Firm*—Hovey, Williams, Timmons & Collins

[57] ABSTRACT

An extension handle apparatus includes an elongated sliding member telescopically received within a tubular receiving member, and a lock assembly for releasably locking the sliding member in any selected axial position relative to the receiving member upon relative rotation between the sliding member and the receiving member. The lock assembly includes a cam supported on the sliding member within the receiving member and includes an elongated body defining a longitudinal axis of the cam and possessing a non-circular cross-sectional shape presenting major and minor diameters through the longitudinal axis that are offset from one another by 90. The assembly also includes a shoe of generally C-shaped cross-section supported on the cam body. The shoe includes an axial opening of non-circular cross-sectional shape corresponding to the cross-sectional shape of the cam body, and the opening presents major and minor diameters through the longitudinal axis of the shoe that are offset from one another by 90°. The minor diameter of the opening is about equal to the minor diameter of the cam body, and is smaller than the major diameter of the cam body. Structure is provided for retaining the shoe on the cam body and preventing relative axial shifting movement between the shoe and the cam. The cam body is rotatable relative to the shoe between a locked position in which the major diameter of the cam body is aligned with the minor diameter of the shoe opening, forcing the shoe against the inner surface of the receiving member to lock the sliding member against axial movement, and an unlocked position in which the minor diameter of the cam body is aligned with the minor diameter of the shoe opening, releasing the locking force on the shoe to allow the sliding member to be extended and retracted.

9 Claims, 1 Drawing Sheet

U.S. Patent        Dec. 2, 1997        5,692,856
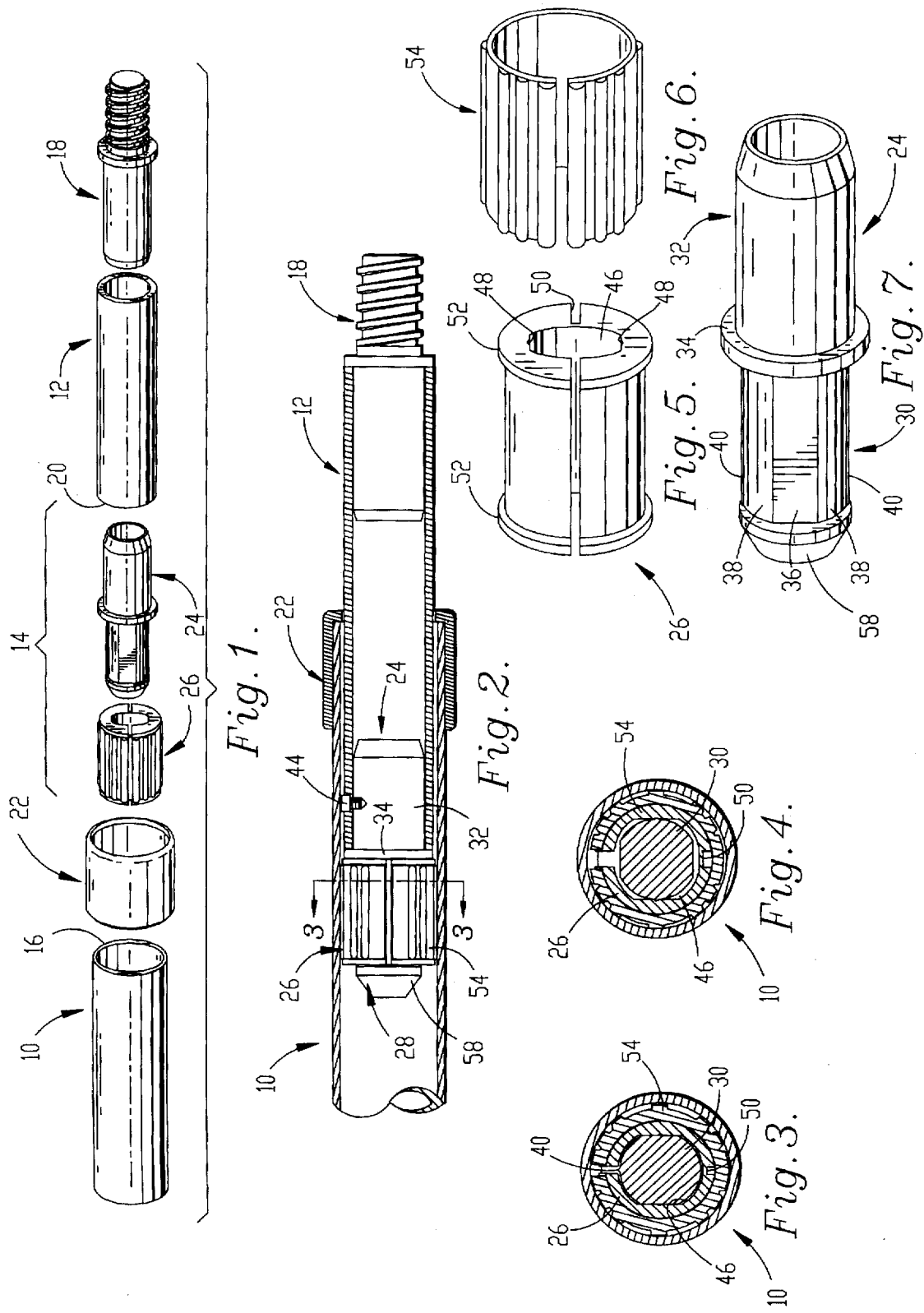

LOCK ASSEMBLY FOR EXTENSION HANDLE

BACKGROUND OF THE INVENTION

1. Field of the Invention

The present invention relates generally to tool reach extension handles, and more particularly to a lock assembly for releasably locking a pair of relatively shiftable handle members in a selected axial position.

2. Discussion of the Prior Art

Tool extension handles are commonly used to extend the reach of tools such as paint rollers, brushes and mops so that such tools can be used in hard-to-reach spots such as ceilings and the upper reaches of high walls.

It is known from U.S. Pat. No. 5,460,458 to provide a lock assembly for selectively locking a pair of relatively shiftable members of such handles together so that the length of the handle is adjustable to suit the needs of a particular application. The lock assembly includes a cam supported on the proximal end of the inner handle member, and a pair of shoes that are supported between the cam and the outer handle member so that when the cam is rotated relative to the shoes to a locked position, the shoes are forced radially outward against the outer member, locking the two handle members together to prevent relative axial shifting movement.

The cam in the known lock assembly is formed of oval cross-sectional shape, presenting a pair of opposed cam surfaces, and the shoes each present an inner cam-engaging surface against which one of the cam surfaces bear. The cam-engaging surface of each shoe includes a central notch and a pair of second notches spaced circumferentially from the central notch on either side thereof. The radial thickness of each shoe at the central notch is smaller than at the two second notches so that when the cam surfaces are engaged with the first notches, the assembly is unlocked and the handle members are free to be shifted axially relative to one another. However, when the cam surfaces are engaged with the second notches to either side of the central ones, the assembly is locked, and the handle members cannot be shifted.

In order to move the lock assembly between the unlocked and locked positions, the handle members can be rotated in either direction relative to one another. However, in order to return the assembly to the unlocked position, it is necessary to turn the members in the direction opposite to that in which they were turned to lock the assembly. Thus, if the members were rotated counterclockwise to lock the assembly, they must be rotated clockwise to unlock the assembly. It is not possible to continue rotating the members in the same direction beyond either locked position.

OBJECTS AND SUMMARY OF THE INVENTION

It is an object of the present invention to provide a lock assembly for a tool reach extension handle, wherein the assembly permits the handle members to be locked against axial movement in any selected position simply by rotating the members in either direction relative to one another. In addition, it is an object of the invention to permit the members to be unlocked by rotating the members relative to one another in either direction from the locked position. Thus, regardless of the direction of relative rotation of the handle members, the lock assembly is toggled between the locked and unlocked position with each quarter turn, improving the versatility and simplifying operation of the handle.

In accordance with these and other objects evident from the following description of a preferred embodiment of the invention, an extension handle apparatus is provided, and includes a tubular receiving member presenting an open receiving end and an inner surface, and an elongated sliding member having a first axial end that protrudes beyond the receiving member, and a second axial end telescopically received within the receiving member through the receiving end for allowing axial extension and retraction of the sliding member. A lock assembly is provided for releasably locking the sliding member in any selected axial position relative to the receiving member upon relative rotation between the sliding and receiving members. The lock assembly includes a cam supported on the sliding member within the receiving member, and a shoe of generally C-shaped cross-section supported on the cam.

The cam of the inventive lock assembly includes an elongated body defining a longitudinal axis of the cam and possessing a non-circular cross-sectional shape presenting major and minor diameters through the longitudinal axis that are offset from one another by 90°. The major diameter of the cam body is greater than the minor diameter.

The shoe of the lock assembly is supported on the cam body and includes an axial opening of non-circular cross-sectional shape corresponding to the cross-sectional shape of the cam body. The opening presents major and minor diameters through the longitudinal axis of the shoe that are offset from one another by 90°, the minor diameter of the opening being about equal to the minor diameter of the cam body and smaller than the major diameter of the cam body. A retaining means is provided for retaining the shoe on the cam body and preventing relative axial shifting movement between the shoe and the cam.

The cam body is rotatable relative to the shoe between a locked position in which the major diameter of the cam body is aligned with the minor diameter of the shoe opening, forcing the shoe against the inner surface of the receiving member to lock the sliding member against axial movement, and an unlocked position in which the minor diameter of the cam body is aligned with the minor diameter of the shoe opening, releasing the locking force on the shoe to allow the sliding member to be extended and retracted.

By providing a lock assembly in accordance with the present invention, numerous advantages are realized. For example, by providing a cam having a body that cooperates with a shoe in the manner described, a construction results wherein it is possible to continue rotating the handle members in the same direction relative to one another beyond the locked or unlocked position in order to reverse the position of the assembly. Thus, no matter what direction the user turns the handle members relative to one another from the unlocked position, the handle is locked after a quarter of a turn is made, and regardless of the direction in which the members are turned from the locked position, the handle is unlocked after a quarter of a turn.

BRIEF DESCRIPTION OF THE DRAWING FIGURES

The preferred embodiment of the present invention is described in detail below with reference to the attached drawing figures, wherein:

FIG. 1 is an exploded perspective view of a tool reach extension handle including a lock assembly constructed in accordance with the preferred embodiment;

FIG. 2 is a fragmentary sectional view of the assembled extension handle;

FIG. 3 is a sectional view through line 3—3 of FIG. 2, illustrating the lock assembly in an unlocked position;

FIG. 4 is a sectional view through line 3—3 of FIG. 2, illustrating the lock assembly in a locked position;

FIG. 5 is a perspective view of a shoe forming a part of the lock assembly;

FIG. 6 is a perspective view of a sleeve forming a part of the shoe; and

FIG. 7 is a perspective view of a cam forming a part of the lock assembly.

DETAILED DESCRIPTION OF THE PREFERRED EMBODIMENT

A tool reach extension handle constructed in accordance with the preferred embodiment is illustrated in FIG. 1, and broadly includes a tubular receiving member 10, a tubular sliding member 12 telescopically coupled with the receiving member, and a lock assembly 14 for releasably locking the sliding member in any selected axial position relative to the receiving member upon relative rotation between the two members.

The receiving member 10 is preferably composed of fiberglass or a combination of fiberglass and aluminum, and presents a generally circular cross-sectional shape. One end of the receiving member is enclosed by an end cap for preventing dirt and debris from entering the member. The opposite end of the member presents an open receiving end 16 within which the sliding member is accommodated.

The sliding member 12 also includes a circular cross-sectional shape, and presents a first end that is enclosed by a threaded fitting 18 adapted to support any one of a plurality of different tools, e.g. a paint roller, brush or mop, so that use of the tool in a hard-to-reach location is facilitated. The opposite end of the sliding member presents an open receiving end 20 within which the lock assembly 14 is supported. As with the receiving member, the sliding member is preferably formed of fiberglass or a combination of fiberglass and aluminum.

The receiving member 10 presents an inner surface and includes an inner diameter that is slightly larger than the outer diameter of the sliding member 12 so that the sliding member is telescopically received within the member for relative axial shifting movement. A retention collar 22 is secured to the end of the receiving member and presents a reduced-diameter neck adjacent the open receiving end 16 of the member, as shown in FIG. 2, for retaining the sliding member within the receiving member.

The lock assembly 14 is shown in FIG. 1, and includes a cam 24 supported in the open receiving end of the sliding member, and a shoe 26 supported on the cam for relative rotational movement.

The cam 24 is illustrated in FIG. 7, and is preferably molded of a unitary piece of material such as acetal (an example of which is marketed under the trademark DELRIN™). However, any desired material may be used. The cam includes an elongated body 30 formed at a first end of the cam, an elongated, tubular plug 32 formed at the end of the cam opposite the body, and an intermediate flange 34 protruding from the circumference of the cam between the body and the plug. The body 30 defines a longitudinal axis and possesses a non-circular cross-sectional shape presenting major and minor diameters through the longitudinal axis that are offset from one another by 90°. Preferably, as shown in FIG. 3, the cross-sectional shape of the body is defined by a circle that is truncated by a pair of parallel planes such that the body presents two radially opposed flat surfaces 36 that are each offset by 90° from two arcuate surfaces 38. The minor diameter extends through the longitudinal axis in a direction perpendicular to the flat surfaces, and the major diameter of the preferred construction is perpendicular to the minor diameter, extending through the longitudinal axis between the arcuate surfaces. Thus, the major diameter is greater than the minor diameter.

The cam body 30 includes axially extending ribs 40 that protrude from each of the arcuate surfaces 38, and each of the ribs is circumferentially offset from the minor diameter by 90°. As described below, the ribs cooperate with the shoe 26 to provide a snap-fit indication of the position of the lock assembly.

A button 58 is formed on the end of the body 30, and is used to hold the shoe on the cam. The button includes a flange having a diameter greater than the major diameter defined by the cam body and is tapered toward the free end of the body so that it is possible to force the shoe over the flange during assembly. The flange 34 on the cam 24 is also of an enlarged diameter relative to the cam body 30 such that the two flanges 34, 58 together prevent the shoe from shifting axially relative to the cam body. However, the flanges are separated from one another by a distance slightly greater than the length of the shoe so that the shoe is free to rotate relative to the cam body.

With reference to FIG. 7, the plug 32 of the cam is tubular, presenting a free end that is tapered to facilitate receipt of the plug within the open receiving end 20 of the sliding member 12. As shown in FIG. 2, a fastener 44 is provided for securing the plug to the sliding member so that the lock assembly moves axially with the sliding member 12 relative to the receiving member 10. The flange 34 provides a stop for positioning the cam in the open receiving end of the sliding member, and also positions the shoe 26 over the cam body 30. Thus, the shoe is allowed only to rotate on the cam body, but otherwise moves with the cam during axial shifting movement of the sliding member 12.

As mentioned, the shoe is generally C-shaped, and thus presents an axial opening 46 within which the cam body is received. As shown in FIG. 3, the opening 46 is of non-circular cross-sectional shape corresponding to the cross-sectional shape of the cam body 30, and presents major and minor diameters through the longitudinal axis of the shoe that are offset from one another by 90°. The minor diameter of the opening 46 is about equal to the minor diameter of the cam body 30, and is smaller than the major diameter of the cam body. As shown in FIG. 5, axially extending inner grooves 48 are formed in the inner surface of the shoe and are aligned circumferentially with the minor diameter of the opening so that they are engaged by the ribs of the cam body when the body is rotated to the position shown in FIG. 4.

An axially extending hinge 50 is formed in the shoe opposite the mouth defined by the opening 46 Preferably, the hinge 50 is formed by an elongated channel formed in the outer circumferential surface of the shoe and extending radially inward toward the opening. The channel weakens the resistance of the shoe to bending along the hinge, allowing the two halves of the shoe to bend relative to one another. A pair of annular flanges 52 are also formed on the shoe at the opposite axial ends thereof, and are adapted to support a C-shaped sleeve of gripping material on the shoe such as the sleeve 54 shown in FIG. 6.

The sleeve 54 of gripping material is secured to the outer surface of the shoe for engaging the inner surface of the receiving member in the locked position of the assembly, shown in FIG. 4. The gripping material may be molded over the shoe, and is soft and resilient when compared to the material used to form the shoe. An example of a material adapted for use as the gripping material is urethane, although other soft, compressible materials having a relatively high coefficient of friction may be used. The purpose of providing this outer layer of material is to increase the resistance exerted by the shoe on the inner surface of the receiving member against relative movement. Although the gripping material is shown as extending over and covering the hinge, it is possible to employ two independent strips of gripping material, each covering half of the shoe on either side of the hinge.

In operation, the lock assembly is normally maintained in an unlocked position as shown in FIG. 3, wherein the shoe 26 is oriented on the cam body 30 with the minor diameter of the shoe opening 46 aligned with the minor diameter of the cam body. In this position, the shoe 26 assumes its natural shape, and does not press against the inner surface of the receiving member with enough force to prevent relative axial shifting movement between the handle members. Thus, the assembly is "unlocked," permitting free relative axial shifting movement between the handle members 10, 12.

Enough contact does exist between the outer layer of the shoe 26 and the receiving member 10 to cause the shoe to grip the inner surface of the receiving member as the sliding member 12 and cam 24 are rotated a quarter-turn relative to the receiving member. Thus, the lock assembly moves to the position shown in FIG. 4, wherein the major diameter of the cam body 30 is aligned with the minor diameter of the shoe opening 46. In this "locked" position, the cam body deforms the shoe, forcing the shoe firmly against the inner surface of the receiving member 10 to lock the sliding member 12 against further axial movement. Deformation of the shoe 26 occurs primarily at the hinge 50 such that each half of the shoe is pivoted about the hinge into engagement with the inner surface of the receiving member. When the position of FIG. 4 is reached, the ribs 40 on the cam body engage the grooves 48 of the shoe, providing a snap-fit indication that the assembly is locked. Thus, the user receives a positive indication that it is safe to use the tool in the selected length, and that no further manipulation of the lock assembly is required to maintain the handle in the locked position.

Thereafter, in order to unlock the assembly, the sliding member 12 is rotated a quarter-turn in either direction relative to the receiving member 10 until the cam body 30 and shoe 26 assume the orientation shown in FIG. 3. It does not matter what direction the sliding member is rotated, the assembly will always move between the locked and unlocked positions for every quarter-turn of the sliding member relative to the receiving member. Thus, it is impossible to hit a dead end beyond which further rotation of the sliding member is not possible.

Although the present invention has been described with reference to the preferred embodiment, it is noted that equivalents may be employed and substitution made herein without departing from the scope of the invention as recited in the claims.

What is claimed is:

1. An extension handle apparatus comprising:

a tubular receiving member presenting an open receiving end and an inner surface;

an elongated sliding member having a first axial end that protrudes beyond the receiving member, and a second axial end telescopically received within the receiving member through the receiving end for allowing axial extension and retraction of the sliding member relative to the receiving member; and a lock assembly for releasably locking the sliding member in any selected axial position relative to the receiving member upon relative rotation between the sliding member and the receiving member, the lock assembly including a cam supported on the sliding member within the receiving and including an elongated body defining a longitudinal axis of the cam and possessing a non-circular cross-sectional shape presenting major and minor diameters through the longitudinal axis that are offset from one another by 90 degrees, the major diameter being greater than the minor diameter, a shoe of generally C-shaped cross-section supported on the cam body and defining a longitudinal axis, the shoe including an axial opening of non-circular cross-sectional shape corresponding to the cross-sectional shape of the cam body, the opening presenting major and minor diameters through the longitudinal axis of the shoe that are offset from one another by 90 degrees, the minor diameter of the opening being about equal to the minor diameter of the cam body and smaller than the major diameter of the cam body, and a retaining means for retaining the shoe on the cam body and preventing relative axial shifting movement between the shoe and the cam, the cam body being rotatable relative to the shoe between a locked position in which the major diameter of the cam body is aligned with the minor diameter of the shoe opening, forcing the shoe against the inner surface of the receiving member to lock the sliding member against axial movement, and an unlocked position in which the minor diameter of the shoe opening of the cam body is aligned with the minor diameter on the shoe opening, releasing the locking force on the shoe to allow the sliding member to be extended and retracted wherein the cross-sectional shapes of the cam and the shoe permit the cam body to be rotated in one direction to its locked position and to be subsequently rotated in the same direction to its unlocked position.

2. An apparatus as recited in claim 1, wherein the cam includes a plug extending beyond the cam body, and the second end of the sliding member is open and receives the plug to support the cam on the sliding member.

3. An apparatus as recited in claim 1, further comprising an outer layer of gripping material on the shoe for engaging the inner surface of the receiving member when the cam body is rotated to the locked position, the layer of gripping material being soft and resilient relative to the shoe.

4. An apparatus as recited in claim 1, wherein the cam body includes an axially extending rib that protrudes from the major diameter of the cam body, and the shoe includes an axially extending inner groove aligned with the minor diameter of the opening, the rib engaging the groove in the locked position of the cam body to provide a snap-fit indication of the locked condition.

5. An apparatus as recited in claim 2, wherein the retaining means includes a first flange provided on the cam between the cam body and the plug, and a second flange provided adjacent the cam body opposite the first flange.

6. An apparatus as recited in claim 1, wherein the shoe presents an axially extending mouth communicating with the opening, and includes an axially extending hinge diametrically opposed to the mouth.

7. An apparatus as recited in claim 6, wherein the hinge is formed of a groove in the shoe.

8. An apparatus as recited in claim 6, further comprising an outer layer of gripping material on the shoe for engaging the inner surface of the receiving handle when the cam body is rotated to the locked position, the layer of gripping material being soft and resilient relative to the shoe and extending circumferentially over the hinge.

9. An apparatus as recited in claim 1, the cam presenting an outer circumferential surface that is substantially continuous and free of protruding steps, the shoe presenting an inner wall that is substantially continuous and free of steps that would engage the outer circumferential surface of the cam, whereby the cam can be rotated in one direction to its locked position and to be subsequently rotated in the same direction to its unlocked position.

* * * * *